No. 721,598. PATENTED FEB. 24, 1903.
W. H. McCORMICK & R. D. MACPHAIL.
BICYCLE COASTER BRAKE.
APPLICATION FILED AUG. 14, 1902.
NO MODEL.
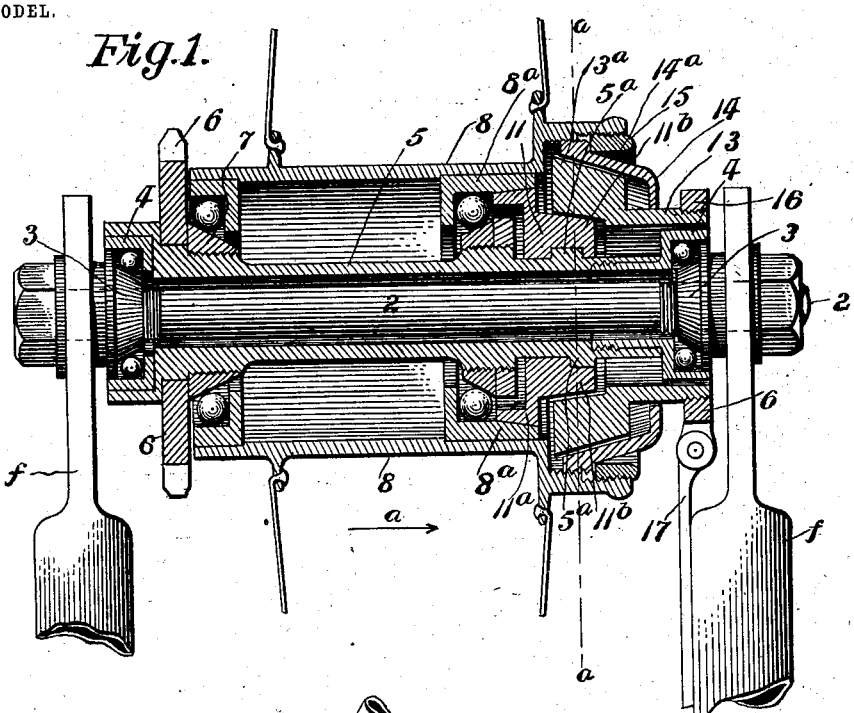
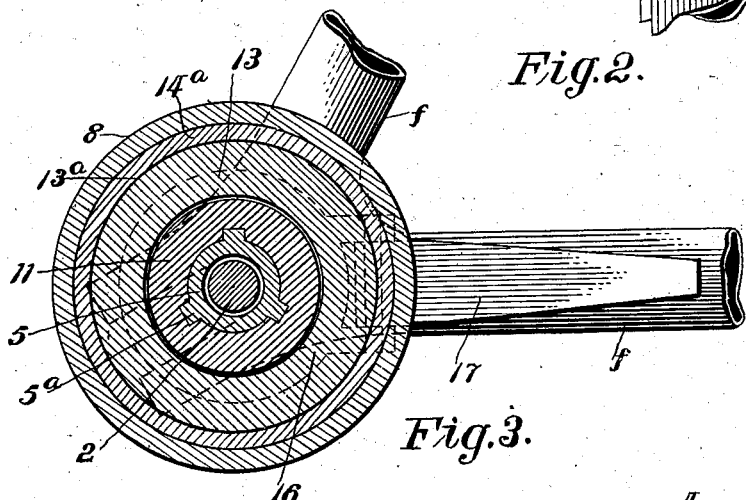
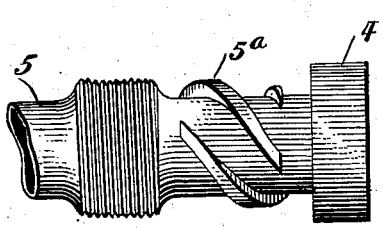
WITNESSES:
Guy O. Worthington
Louis Dieterich
INVENTORS
William H. McCormick
Robert D. Macphail
BY
Fred G. Dieterich
ATTORNEY

UNITED STATES PATENT OFFICE.

WILLIAM H. McCORMICK, OF NEW WESTMINSTER, AND ROBERT D. MAC-PHAIL, OF VANCOUVER, CANADA.

BICYCLE COASTER-BRAKE.

SPECIFICATION forming part of Letters Patent No. 721,598, dated February 24, 1903.

Application filed August 14, 1902. Serial No. 119,633. (No model.)

*To all whom it may concern:*

Be it known that we, WILLIAM H. MCCORMICK, a citizen of the Dominion of Canada, residing at New Westminster, and ROBERT D. MACPHAIL, a citizen of the United States, residing at Vancouver, in the Province of British Columbia, Canada, have invented a new and useful Bicycle Coaster-Brake, of which the following is a specification.

Our invention relates to an improved free wheel and brake-gear for bicycles of that class wherein the clutch-and-brake mechanism is situated within the hub-casing of the driving-wheel and is operated from the crank-pedals.

The device and its means of operation are fully described in the following specification and illustrated in the drawings which accompany it.

Figure 1 is a longitudinal section; Fig. 2, a cross-section on the line $a$ $a$ in Fig. 1; and Fig. 3, a detail of the driving-sleeve, showing the clutch-screw or spiral feathers.

In the drawings, $f$ represents the frame of the machine, and 2 the axle of the driving-wheel, which is secured to the frame in the usual manner and carries the cones 3 of the ball-bearings on which a sleeve 5 is rotatable. The cups 4 of the bearings are secured to this sleeve, and to one end of it is fastened the sprocket 6 of the driving-gear or if applied to a chainless wheel to the bevel-pinion.

On the driving-sleeve 5 the hub 8 of the wheel is free to run on suitable ball-bearings, and on the opposite side of the wheel to the drive-gear 6 the driving-sleeve 5 is provided with a series of right-hand quick-pitch screw-threads $5^a$, forming virtually spiral driving-feathers to engage and rotate the clutch 11, slidable thereon. This clutch has on one side a conical seat $11^a$, adapted to enter and engage a corresponding recess $8^a$ of the wheel-hub, by which construction the driving-sleeve when rotated in a direction to drive the wheel forward forces the cone of the clutch by means of the spiral feathers into close driving contact with the wheel-hub 8, and they are rotated together. The heavier the drive the tighter the grip of the clutch, as the incline of the feathers draws the clutch tight against the hub.

The spiral feathers further enable the clutch to free itself at once from contact with the hub if the driving-sleeve 5 is held while the wheel rotates, as when the feet are stationary on the pedals for coasting or running free.

Under proper working conditions the clearance between the coned surfaces of clutch and hub will be so slight when the wheel is running free that they will catch at once and be drawn into close contact by the incline of the feathers when movement is imparted to the driving-sleeve to propel the wheel forward. To guard, however, against the effect of excessive end movement through neglect to properly take up the wear, a light coil-spring may be interposed between the cup member of the spindle-bearing and the clutch, by which means the clutch will be normally in light contact with the hub.

On the opposite side of the clutch to the driving-cone $11^a$ is a reverse cone $11^b$, adapted to enter a corresponding recess in a brake-ring 13, which is endwise slidable in a brake-casing 14, adjustably secured to the hub 8 by a left-hand thread and locked at any desired position by the lock-ring 15, screwed within the hub with a right-hand thread. This casing 14 has an interior brake-cone surface $14^a$, into frictional contact with which a corresponding cone $13^a$ of the brake-ring 13 may be forced by the backward movement of the driving-sleeve running the clutch along the incline of the feathers $5^a$, the contact pressure between the surfaces of the brake-cones being in every case proportional to the backward effort exerted on the pedals and transmitted through the driving-gear 6 and sleeve 5 to the clutch 11.

The brake-ring 13 is reduced in diameter and passes through an aperture in the brake-casing 14 and exterior to the casing has a ring 16 attached to it, by which it is connected by a hinged joint to an attachment 17 on the frame of the machine. This connection prevents the brake-ring 13 from rotating with either the driving-sleeve or the wheel-hub.

The operation of our device is extremely simple. The effort of turning the cranks with the object of driving the wheel forward securely clutches, by means of the spiral feathers, the driving-sleeve to the wheel-hub, and they run together as one on the axle 2; but when it is desired to run with a free wheel the movement of the pedals is stopped, and the wheel-hub going forward their motion in relation to one another is reversed, and the clutch is immediately backed on the incline of the feathers out of contact with the conical recess of the hub, leaving the wheel free to turn on its bearings on the sleeve. It must be noted that as soon as the surfaces of clutch and hub are out of contact there can be no further effort through them to rotate the clutch on the spiral feathers, and a very trifling end movement or clearance between the surfaces may therefore be provided, thus enabling the clutch to seize at once when it is desired to drive the wheel forward again, and the forward rotation of the cranks is resumed.

When it is desired to check the wheel by brake, a slight backward movement of the pedals by reversing the action of the spiral feathers will run the clutch away from the hub-cone, and backing it against the brake-ring 13 the cone of the latter will be forced against the interior cone of the brake-casing 14, the pressure with which they are forced together being regulated to the rider's requirements by the backward effort exerted on the pedals.

We would draw attention to the fact that the mechanism of our device is extremely simple, both in the number of its parts and in the manner of its operation, while the nature of the strains on the several parts is such that they may be made both light and strong, yet be little liable to derangement or objectionable wear, the unavoidable wear of the brake-cone being provided for in the means of adjustment in the brake-casing 14. A further advantage in our gear is that it is applicable to chainless machines on account of the brake-cone and its attachment to the frame of the machine being situated on the opposite side of the hub to the driving mechanism.

We are aware that prior to our invention bicycle coaster-brakes have been made having the brake-cone within or adjacent to the hub of the wheel and operated by a backward movement of the cranks. We do not, therefore, claim such features broadly; but What we do claim as new, and desire to be protected in by Letters Patent, is—

1. In a bicycle drive mechanism as described, a fixed axle, having conical bearings at each end, a drive-sleeve rotatably mounted upon said axle having engagement therewith at its ends only, a drive-sprocket at one end and a spiral feather integral with the other end of said sleeve, a wheel-hub rotatably mounted at its ends on said drive-sleeve to provide a chamber or space between said drive-sleeve and wheel-hub, a clutch member mounted on said drive-sleeve and having engagement with the said spiral feather, said clutch member having a conical surface on the outside thereof, the aforesaid hub having a conical surface on the interior thereof, said clutch-surface adapted to tightly engage said hub-surface when the sleeve is driven in a forward direction whereby to lock the sleeve and the hub into operative engagment with each other for the purposes described.

2. A bicycle brake mechanism of the character described, comprising in combination; a fixed axle, a driving-sleeve nearly the full length of said axle and extending from near one end to nearly the other end thereof, a drive-sprocket mounted on one end of said sleeve, a spiral feather near the other end thereof, a clutch member on and in engagement with said sleeve and feathers, and having a sliding movement thereon, said clutch member having two diameters, each of said diameters having conical surfaces, a hub rotatably mounted on said sleeve and having a conical surface for engaging with the larger diameter of the clutch at the forward movement of the sleeve, a brake-ring having two conical surfaces of different diameters, a conical brake-surface mounted on said hub, the aforesaid clutch being adapted to engage said brake-ring, and said brake-ring adapted to engage the conical brake-surface on the forward movement of the drive-sleeve, all being arranged substantially as shown and for the purposes described.

3. In bicycle-brake of the character described, a fixed axle, a drive-sleeve of slightly less length than said axle, and rotatably mounted thereon, a sprocket-wheel mounted on one end of said sleeve, a wheel-hub of less length than said sleeve and rotatably mounted thereon, said hub having a braking-surface and a clutch-engaging surface, a brake-ring having a hinged connection to the frame of the bicycle to prevent rotation of said ring and at the same time allow longitudinal movement of the said ring in a direction parallel with the fixed axles and drive-hub, the said ring being normally out of engagement with said braking-surface, a clutch mechanism slidably mounted on said drive-sleeve and adapted to alternately engage said sleeve braking-surface and said braking-ring, for the purposes described.

In testimony whereof we have signed our names to this specification in the presence of two subscribing witnesses.

WILLIAM H. McCORMICK.
ROBERT D. MACPHAIL.

Witnesses:
ROWLAND BRITTAIN,
RICHARD B. WARD.